T. E. McKEE.
FISHING TOOL.
APPLICATION FILED APR. 1, 1912.

1,056,197.

Patented Mar. 18, 1913.

Witnesses:
J. D. Thornburgh.
Sully Russo

Inventor
Thomas E. McKee.
By Lyon & Hackley
His Attys

UNITED STATES PATENT OFFICE.

THOMAS E. McKEE, OF MARICOPA, CALIFORNIA.

FISHING-TOOL.

1,056,197.

Specification of Letters Patent. Patented Mar. 18, 1913.

Application filed April 1, 1912. Serial No. 687,879.

*To all whom it may concern:*

Be it known that I, THOMAS E. MCKEE, a citizen of the United States, residing at Maricopa, in the county of Kern and State of California, have invented a new and useful Fishing-Tool, of which the following is a specification.

This invention relates to fishing tools for use in well drilling, the object of the invention being to provide a tool of the overshot type which is durable, effective and reliable in operation, and simple and cheap in construction.

Other objects of the invention will appear hereinafter.

Figure 1:
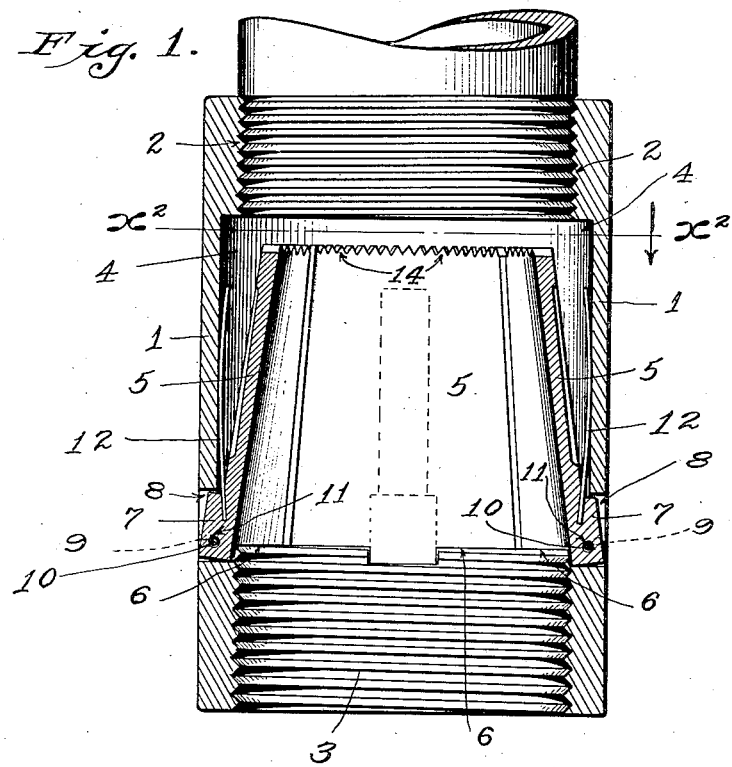
Figure 2:
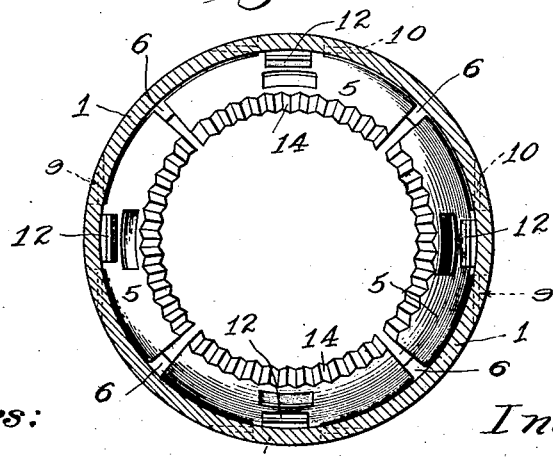

The accompanying drawings illustrate an embodiment of the invention, and referring thereto: Figure 1 is a vertical section of the fishing tool. Fig. 2 is a horizontal section on line $x^2$—$x^2$ in Fig. 1.

The tool comprises a tubular member or body 1, formed with a screw threaded portion 2 at its upper end for attachment of the supporting and operating casing or tube, and provided with a screw threaded portion 3 at its lower end for attachment of a shoe. The said tubular member 1 is formed with an annular recess as shown at 4 between the upper and lower portions to receive the jaws 5, the shoulder 6 at the lower end of this recess serving as a support or abutment for the several jaws in the operation thereof. Each jaw 5 is provided with an outwardly extending lug 7 which may be substantially square in cross section and fits loosely in a socket or opening 8 formed in the wall of the tubular member 1, a bore 9 being formed in the said wall transversely to the opening 8 to receive a pivot or retaining pin 10 which passes through a perforation 11 in the lug 7 and rests in said bore. The upper end of each jaw 5 is serrated or toothed as shown at 14 to give a better grip or engagement with the parts to be fished. A spring 12, fastened in or to each jaw 5 extends between the jaw and the wall of recess 4 to hold the jaw outwardly.

The operation is as follows: The tubular member 1 is let down into the casing and passes over and around the tool parts, the jaws 5 slipping freely over the pipe or casing as they are being lowered, and being pressed out yieldingly by the springs 12 in this operation. The tubular member 1 is again raised and in this lifting operation, the upper ends of the jaws 5 which are forced inwardly by the springs 12, engage with any projecting collar on the casing and cause the pipe to be lifted along with the tubular member 1. In this lifting operation the strain is taken by the shoulder 6 acting as a seat for the jaws 5, so that the pins 10 are relieved of such strain.

An important advantage of this invention is that it may be used for raising a smaller tube within a larger tube, where the difference in diameter is comparatively small, for example, raising a six inch casing within an eight inch casing. This result is obtained by making the annular recess 4 in the member 1 of such depth that the jaws 5 may fold back entirely within the recess, and by providing a circular series of jaws extending around the bore of the member 1 so as to grip the part to be lifted, from all sides, thereby enabling relatively thin jaws to be used. The jaws being rounded in conformity with the wall of the annular recess are capable of fitting closely in the recess and are also stronger and have a better gripping action on the annular shoulders of the tool or casing to be fished.

What I claim is:

A fishing tool comprising a tubular member having an internal annular recess forming a shoulder at the lower part thereof and provided with openings at the shoulder, a circular series of segmental wedge shaped jaws having lugs at their lower ends extending outwardly into said openings and pivotally connected to said tubular member, the lower ends of said jaws abutting the shoulder formed by the bottom of said recess, said jaws being rounded similarly to the wall of said recess and their inner faces being flush with the tubular member, the jaws having recesses, and springs in the recesses between the jaws and the wall of the annular recess, for pressing the jaws inwardly.

In testimony whereof, I have hereunto set my hand at Maricopa, California this 21st day of March, 1912.

THOMAS E. McKEE.

In presence of—
F. T. TORPEY,
H. C. MOSHER.